US012356144B2

(12) United States Patent
Showalter et al.

(10) Patent No.: US 12,356,144 B2
(45) Date of Patent: *Jul. 8, 2025

(54) ASYMMETRICAL HIGH-FREQUENCY WAVEGUIDE, 3-AXIS RIGGING, AND SPHERICAL ENCLOSURE FOR SURROUND SPEAKERS

(71) Applicant: DOLBY LABORATORIES LICENSING CORPORATION, San Francisco, CA (US)

(72) Inventors: Garth Norman Showalter, Ozark, MO (US); Mario Di Cola, Casoli (IT); John Michael Gott, Ozark, MO (US); Patrick Ross Spurlock, Battlefield, MO (US); Gregory Lynn Carney, Moberly, MO (US); Bryce Joseph Gott, Springfield, MO (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 18/302,552

(22) Filed: Apr. 18, 2023

(65) Prior Publication Data

US 2023/0388702 A1  Nov. 30, 2023

Related U.S. Application Data

(63) Continuation of application No. 17/665,873, filed on Feb. 7, 2022, now Pat. No. 11,659,321, which is a
(Continued)

(51) Int. Cl.
*H04R 1/30* (2006.01)
*F16M 11/04* (2006.01)
(Continued)

(52) U.S. Cl.
CPC ............... *H04R 1/30* (2013.01); *F16M 11/04* (2013.01); *H04R 1/02* (2013.01); *H04R 1/026* (2013.01);
(Continued)

(58) Field of Classification Search
CPC .......... H04R 1/30; H04R 11/02; H04R 1/026; H04R 27/00; H04R 2201/025; F16M 11/04

See application file for complete search history.

(56) References Cited

U.S. PATENT DOCUMENTS 3,812,301 A   5/1974 Lahti
4,308,932 A   1/1982 Keele, Jr.
(Continued)

FOREIGN PATENT DOCUMENTS

CN   1520701 A    8/2004
CN   201608863    10/2010
(Continued)

OTHER PUBLICATIONS

Hayashi, S. et al."The Radiation Characteristics of a Horizontally Asymmetrical Waveguide that Utilizes a Continuous Arc Diffraction Slot" AES presented at the 133rd Convention Oct. 26-29, 2012, San Francisco, CA, USA, pp. 1-13.
(Continued)

*Primary Examiner* — Andrew Sniezek

(57) ABSTRACT

Embodiments are described for a high-frequency waveguide that improves the performance of large-scale surround sound and immersive audio environments. A horn waveguide is configured to be asymmetric about one of a vertical axis and horizontal axis of the waveguide to form an asymmetric horn waveguide. A spherical enclosure surrounds the asymmetric horn waveguide to form a horn speaker, and a three-axis mounting system is configured to fix the horn
(Continued)

speaker to one of a wall or ceiling surface of the venue, wherein the mounting system facilitates rotating the horn speaker to a location that provides maximum coverage of the venue within the passband of the asymmetric horn waveguide.

13 Claims, 11 Drawing Sheets

Related U.S. Application Data continuation of application No. 17/101,382, filed on Nov. 23, 2020, now Pat. No. 11,252,500, which is a continuation of application No. 16/311,656, filed as application No. PCT/US2017/039828 on Jun. 28, 2017, now Pat. No. 10,848,862.

(60) Provisional application No. 62/519,063, filed on Jun. 13, 2017, provisional application No. 62/356,045, filed on Jun. 29, 2016.

(51) Int. Cl.
*H04R 1/02* (2006.01)
*H04R 27/00* (2006.01)

(52) U.S. Cl.
CPC ....... *H04R 27/00* (2013.01); *H04R 2201/025* (2013.01)

(56) References Cited

U.S. PATENT DOCUMENTS

| | | | |
|---|---|---|---|
| 4,580,655 A * | 4/1986 | Keele, Jr. | G10K 11/025 181/187 |
| 4,922,541 A | 5/1990 | Walker | |
| 5,020,630 A | 6/1991 | Gunness | |
| 5,201,896 A | 4/1993 | Kruszewski | |
| 5,664,752 A | 9/1997 | Lars | |
| 6,466,680 B1 | 10/2002 | Gelow | |
| 6,513,622 B1 | 2/2003 | Gelow | |
| 7,046,805 B2 | 5/2006 | Fitzhardinge et al. | |
| 7,203,329 B2 | 4/2007 | Alexander | |
| 7,275,621 B1 | 10/2007 | Delgado, Jr. | |
| 7,883,065 B2 | 2/2011 | Nelson | |
| 8,029,173 B2 | 10/2011 | Ko | |
| 8,724,842 B2 | 5/2014 | Sumitani | |
| 10,848,862 B2 * | 11/2020 | Showalter | H04R 1/02 |
| 11,252,500 B2 * | 2/2022 | Showalter | H04R 1/345 |
| 11,659,321 B2 * | 5/2023 | Showalter | H04R 1/30 381/340 |
| 2003/0133584 A1 | 7/2003 | Werner | |
| 2005/0175207 A1 | 8/2005 | Alexander | |
| 2007/0025580 A1 | 2/2007 | Reardon | |
| 2009/0310808 A1 | 12/2009 | Button | |
| 2010/0278368 A1 | 11/2010 | Martin | |
| 2013/0148835 A1 | 6/2013 | Looney | |
| 2014/0020974 A1 | 1/2014 | Stewart, Jr. | |
| 2015/0063620 A1 | 3/2015 | Ickler | |
| 2017/0251296 A1 | 8/2017 | Smithers | |

FOREIGN PATENT DOCUMENTS

| | | |
|---|---|---|
| CN | 202068558 | 12/2011 |
| CN | 203072135 | 1/2013 |
| CN | 104041071 | 9/2014 |
| CN | 104344366 | 2/2015 |
| CN | 204853134 | 12/2015 |
| JP | S53116731 | 9/1978 |
| JP | S60081999 | 5/1985 |
| JP | H01228296 A | 9/1989 |
| JP | 4505241 | 9/1992 |
| JP | 2000510291 | 8/2000 |
| JP | 2007536051 A | 12/2007 |
| JP | 2013504931 | 2/2013 |
| JP | 2014526168 A | 10/2014 |
| JP | 5800223 | 10/2015 |
| WO | 9904599 | 1/1999 |
| WO | 2003030583 | 4/2003 |
| WO | 2013106335 | 7/2013 |

OTHER PUBLICATIONS

Ian MacDonald "JBL 9300 Series Surround Loudspeakers Provide Optimal Combination of Precision and Power for Cinema Environments", Harman Press Release, Nov. 3, 2015, pp. 1-1, 1 page.

Jake Young, "New JPL Cinema Loudspeaker" Oct. 21, 2013, http:/www.audiomediainternational.com, pp. 1-2, 2 pages.

* cited by examiner

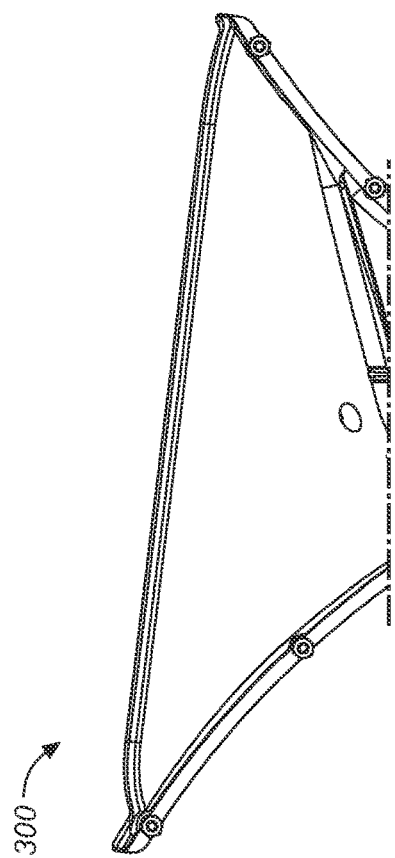
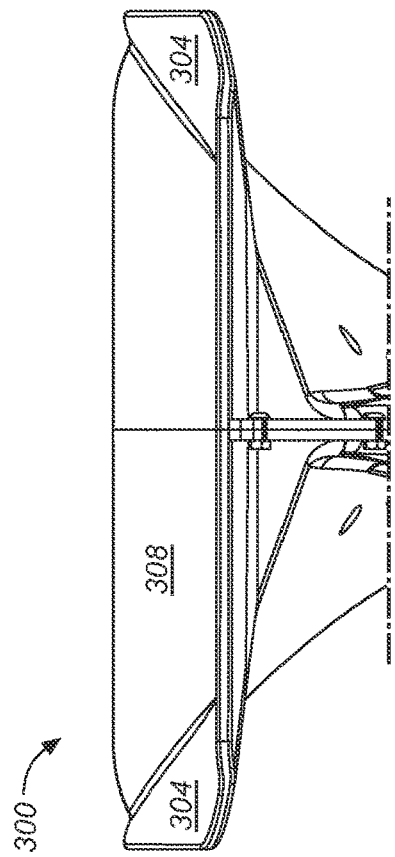

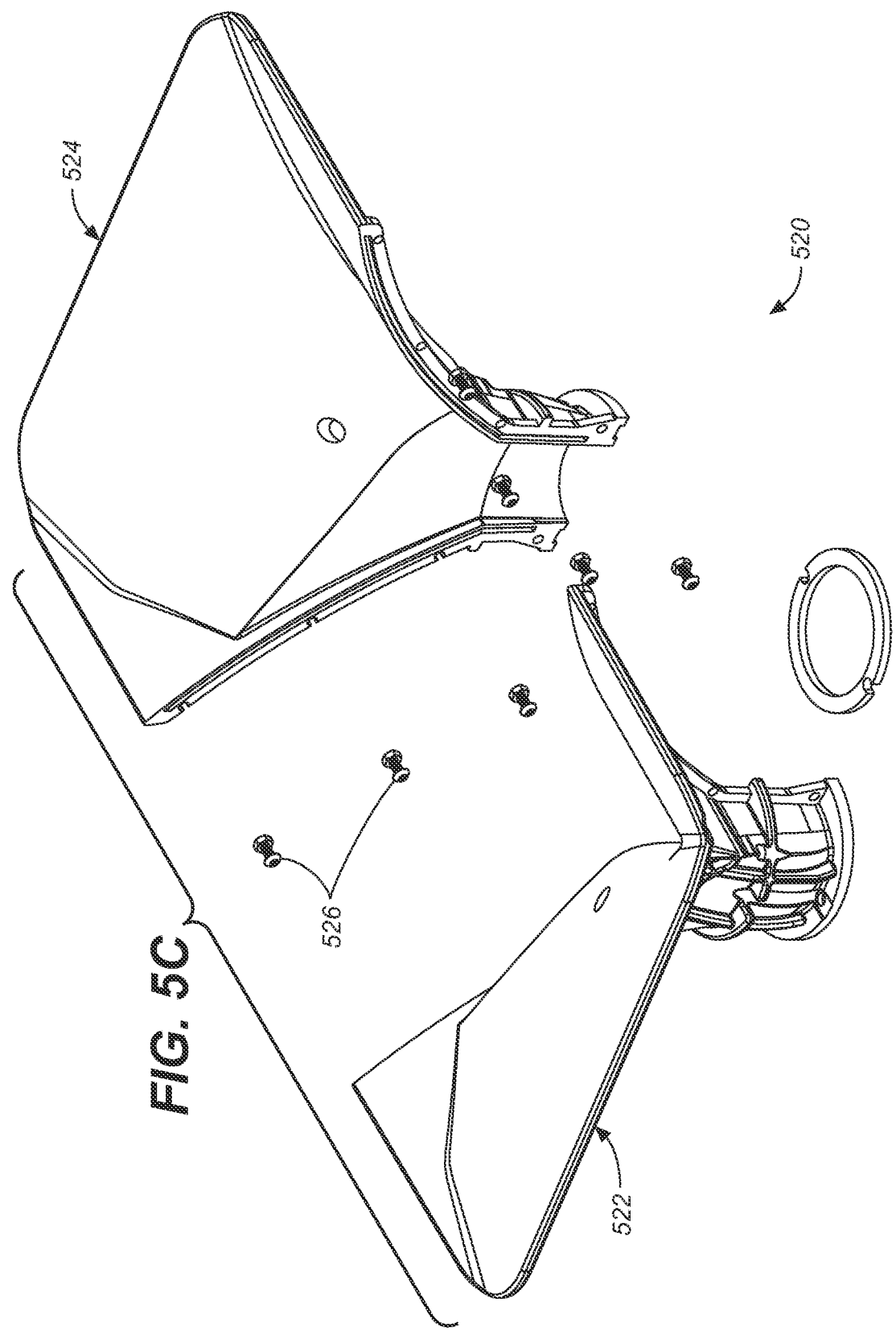

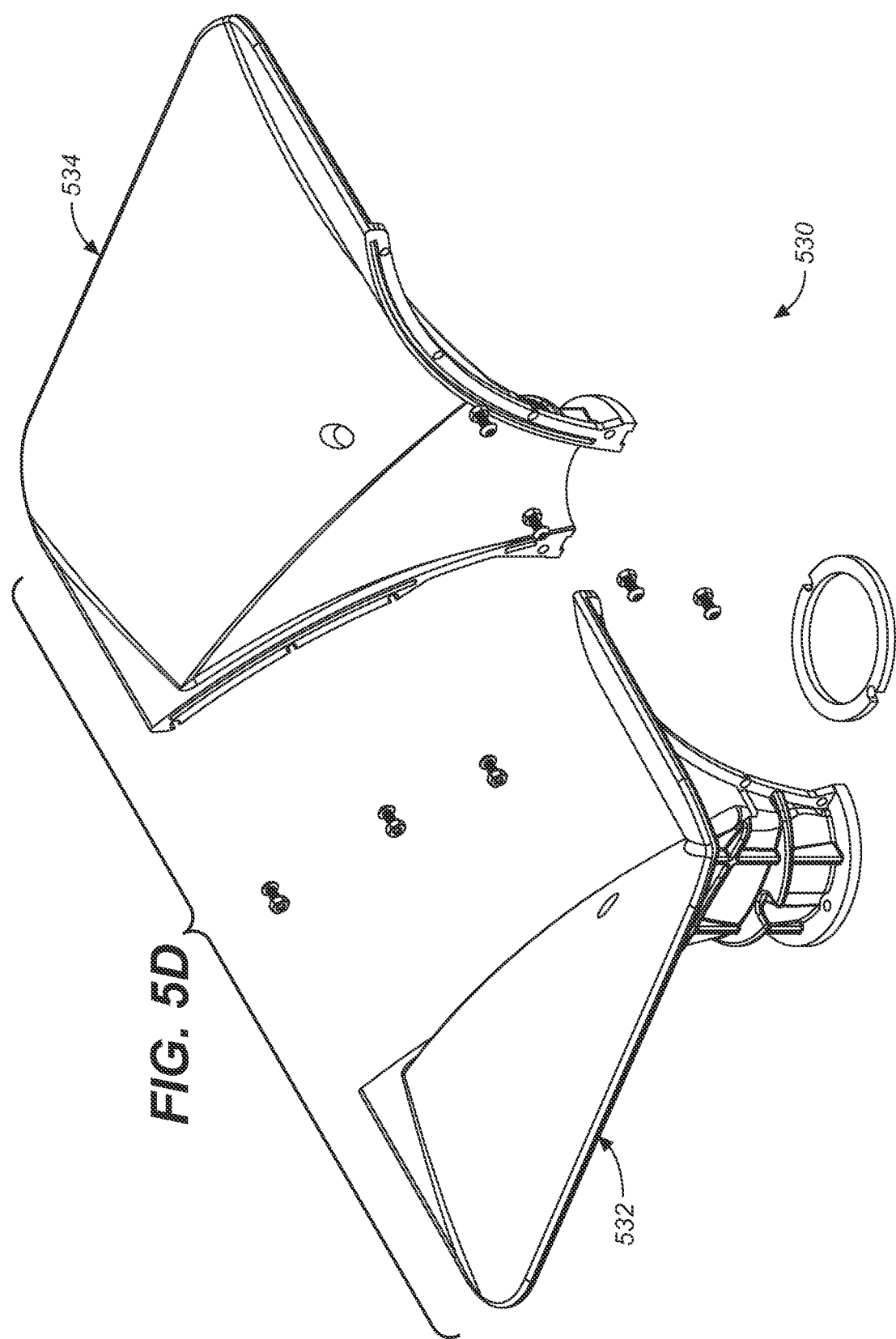

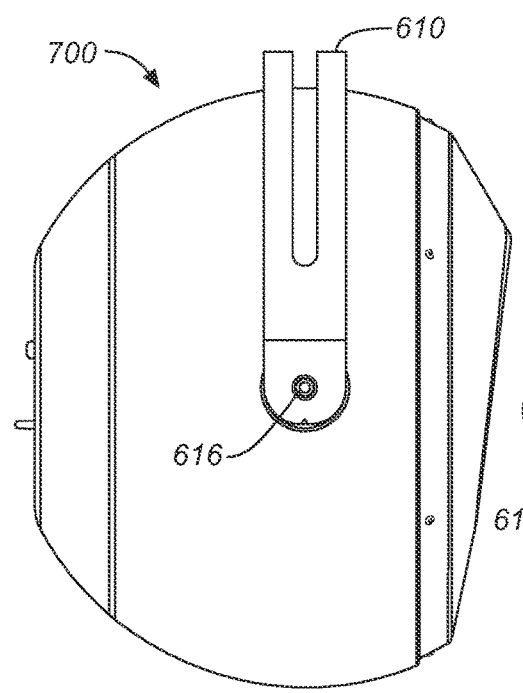
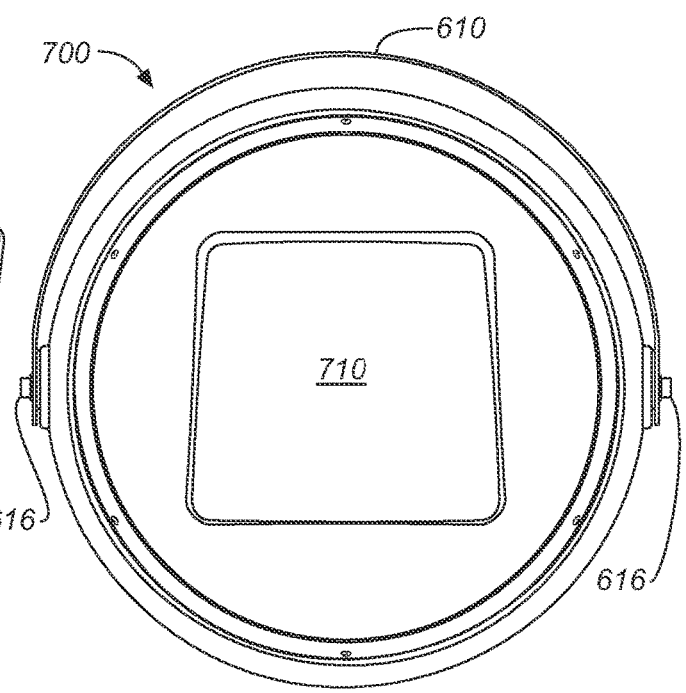
FIG. 7A  FIG. 7B
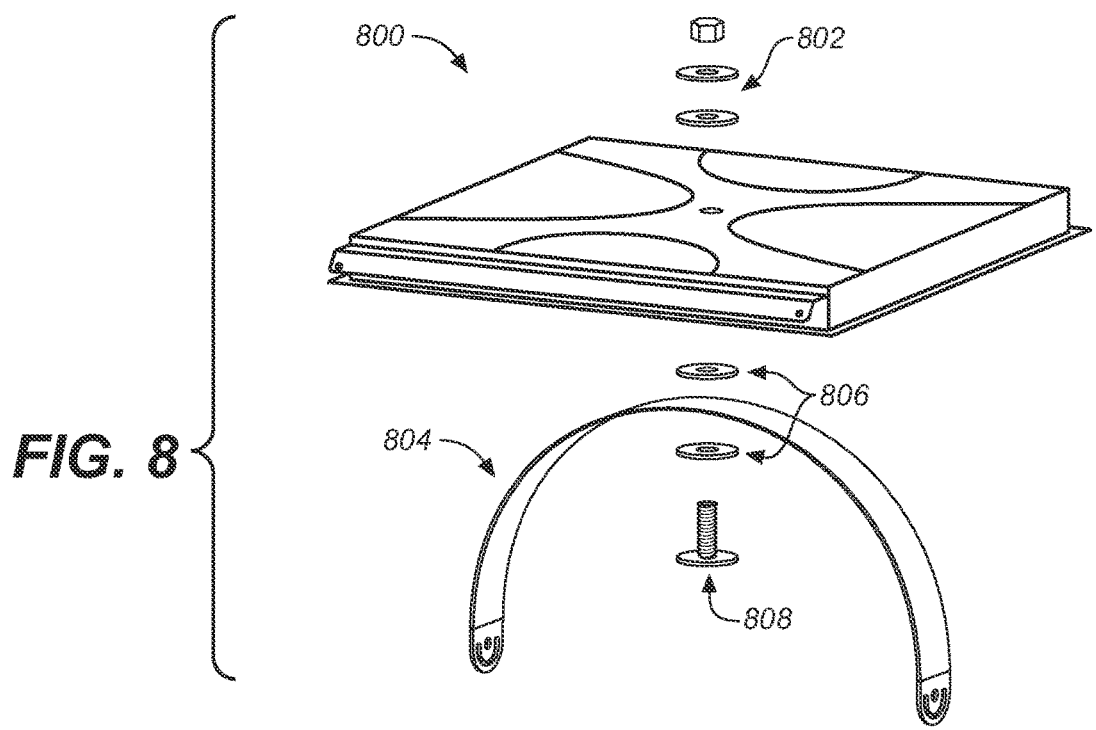
FIG. 8

ASYMMETRICAL HIGH-FREQUENCY WAVEGUIDE, 3-AXIS RIGGING, AND SPHERICAL ENCLOSURE FOR SURROUND SPEAKERS

CROSS-REFERENCE TO RELATED APPLICATIONS

This application is a continuation of U.S. patent application Ser. No. 17/665,873, filed Feb. 7, 2022, which is a continuation of U.S. patent application Ser. No. 17/101,382, filed Nov. 23, 2020, now U.S. Pat. No. 11,252,500, issued Feb. 15, 2022, which is a continuation of U.S. patent application Ser. No. 16/311,656, filed Dec. 19, 2018, now U.S. Pat. No. 10,848,862, issued Nov. 24, 2020, which is the U.S. national stage of International Patent Application No. PCT/US2017/039828, filed Jun. 28, 2017, which claims priority to U.S. Provisional Patent Application 62/356,045, filed Jun. 29, 2016, and to U.S. Provisional Patent Application 62/519,063, filed Jun. 13, 2017, all of which are hereby incorporated by reference in their entirety.

FIELD OF THE INVENTION

One or more implementations relate generally to cinema audio, and more specifically, to a speaker system using an asymmetric horn waveguide, spherical enclosure, and three-axis rigging system for full spectrum audio coverage in cinemas.

BACKGROUND

The advent of digital cinema has created new standards for cinema sound, such as the incorporation of multiple channels of audio to allow for greater creativity for content creators and a more enveloping and realistic auditory experience for audiences. Model-based audio descriptions have been developed to extend beyond traditional speaker feeds and channel-based audio as a means for distributing spatial audio content and rendering in different playback configurations. The playback of sound in true three-dimensional (3D) or virtual 3D environments has become an area of increased research and development. The spatial presentation of sound utilizes audio objects, which are audio signals with associated parametric source descriptions of apparent source position (e.g., 3D coordinates), apparent source width, and other parameters.

Various technologies have been developed to more accurately capture and reproduce the creator's artistic intent for a sound track in cinema environments. A next generation spatial audio format, also referred to as "immersive" audio, and embodied in the Dolby® Atmos® system, has been developed that comprises a mix of audio objects and traditional channel-based speaker feeds along with positional metadata for the audio objects. In a spatial audio decoder, the channels are sent directly to their associated speakers or down-mixed to an existing speaker set, and audio objects are rendered by the decoder in a flexible manner. The parametric source description associated with each object, such as a positional trajectory in 3D space, is taken as an input along with the number and position of speakers connected to the decoder. The renderer utilizes certain algorithms to distribute the audio associated with each object across the attached set of speakers. The authored spatial intent of each object is thus optimally presented over the specific speaker configuration that is present in the listening environment.

Because of the size of many large cinemas and the complex 3D effects provided by surround-sound and spatial audio systems, speaker configuration and placement, especially with respect to height speakers is very important to preserve proper response characteristics across the entire frequency spectrum. For example, in a large venue, good audio for all listeners requires a comprise between a wide, short throw for listeners closest to the source, and a narrow, long throw for those sitting further back. Similarly, coverage must be wider when near the source and narrower when further away. Present height speakers, such as those mounted in side wall locations or the ceiling may use symmetrical or conical horns, which generally do not provide even spectrum coverage. Standard waveguides may provide adequate coverage, but this requires a compromise of lower sensitivity by putting energy where it is not needed or putting some sections of the cinema out of the coverage area by using high Q horns.

What is needed, therefore, is a loudspeaker system for professional installations that improves coverage with high sensitivity and even spectrum content across all seating areas in a listening environment, such as a cinema or other type of auditorium or room.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF EMBODIMENTS

Embodiments are directed to a speaker for transmitting sound into a venue having a conical driver, a horn waveguide acoustically coupled to the driver to form a horn speaker, and which is asymmetric about one of a vertical axis and horizontal axis of the horn speaker; a spherical enclosure; and a three-axis mounting system configured to fix the horn speaker to a ceiling or side wall surface of the venue, wherein the mounting system facilitates rotating and aiming the horn speaker to a location that provides maximum coverage of the venue across an entire audio spectrum. When mounted on the wall, the speaker can be mounted in a high, central, or low of the wall to provide any height or direct sound. An example passband of the waveguide may be frequencies above 1500 Hz, though other ranges are also possible.

The waveguide comprises two symmetric surfaces about the vertical axis of the horn speaker and two asymmetric surfaces about the horizontal axis of the horn speaker. The two symmetric and two asymmetric surfaces are separated by a gap including an opening to the conical driver, and a relative size of each surface, an amount of tilt of each surface, and a size of the gap dictates an optimum projection angle of the horn speaker, and wherein an optimum projection angle is between 50 and 80 degrees. In an embodiment, the venue is a large venue comprising one of a cinema, auditorium, theatre, or large listening room, and the upper surface comprises one of a high wall surface or a ceiling of the venue. The optimum projection angle may comprise an angle that extends close to a bottom side of the horn speaker and is flat across the coverage aiming angle so as to produce a coverage pattern in the venue that softens coverage for a short throw of the speaker and sharpens coverage on a long throw of the speaker in the venue.

In an embodiment, the three-axis mounting system provides pan, tilt, and rotation motion of the horn speaker within a rigid mounting to the upper surface of the venue. The three-axis mounting system provides further control of aiming the horn speaker to the location and is fixed in position once set by manual control. The audio may comprise one of surround sound audio or immersive audio.

Embodiments are further directed to a method of providing an even audio spectrum during playback in a venue by height and wall speakers by providing an asymmetrical horn waveguide acoustically coupled to a conical driver to form a horn speaker, wherein the waveguide imparts a progressive horizontal coverage width and a narrow vertical dispersion, and providing a three-axis mounting system for the installing the horn speaker to an upper surface of the venue, wherein the mounting system facilitates aiming the horn speaker to a location that provides maximum coverage of the venue across an entire audio spectrum. The waveguide spreads high frequency content of the audio across a lower side of the horn speaker. The three-axis mounting system provides pan, tilt, and rotation motion of the horn speaker within a rigid mounting to the upper surface of the venue. The upper surface may comprise one of a high wall location with the horn speaker pointing substantially outwards into the venue, and a ceiling with the horn speaker pointing substantially downwards into the venue. The venue may comprise an enclosed large venue holding a significant number of seats including some seats marginally outside of the location aimed at by the horn speaker. In an embodiment, the horn speaker wall speaker comprises a 60-degree horn speaker, and the ceiling speaker comprises an 80-degree horn speaker.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3C is a front view of the waveguide of FIG. 3A.

FIG. 3D is a side view of the waveguide of FIG. 3A.

FIG. 5C is a cutaway view of the example waveguide of FIG. 4 under a first embodiment.

FIG. 5D is a cutaway view of the example waveguide of FIG. 4 under a second embodiment.

FIG. 7A illustrates a side view of a spherical speaker enclosure for use with a rigging assembly under some embodiments.

FIG. 7B illustrates a front or rear view of the mounted speaker of FIG. 7A under an embodiment.

FIG. 8 illustrates a ceiling mount rigging system for an asymmetrical horn waveguide speaker under an embodiment.

DETAILED DESCRIPTION

Figure 1:
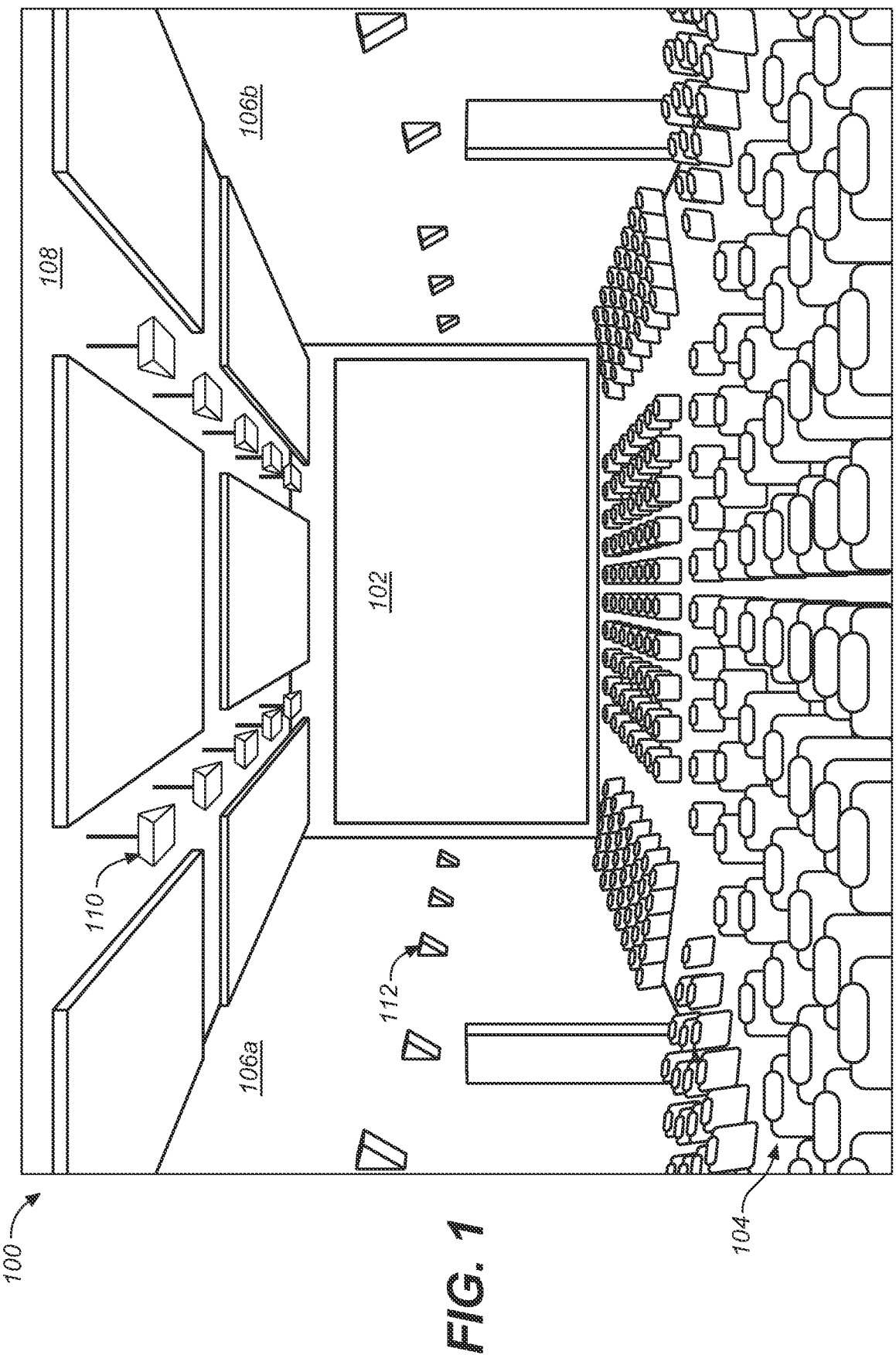
FIG. 1 shows a cinema or similar listening environment that contains one or more speakers and speaker mounting systems under some embodiments.

Embodiments are described for a custom high-frequency waveguide that improves the performance of large-scale surround sound and immersive audio environments. A novel waveguide design, spherical speaker enclosure, and 3-axis rigging system is configured to take advantage of the typical shoebox-type shape of cinemas and auditoriums to use mechanical high frequency equalization (EQ) by using asymmetrical coverage patterns that soften coverage on the short throw and sharpen coverage on the long throw. For purposes of description, the term "3-axis speaker assembly" refers to a speaker system that includes a rigging system and a speaker that comprises a spherical speaker enclosure and an asymmetrical horn waveguide. Thus, the 3-axis speaker assembly comprises the three main components of a waveguide, spherical enclosure, and rigging system.

Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

For purposes of the present description, the term "speaker" or "loudspeaker" means a complete loudspeaker cabinet incorporating one or more loudspeaker drivers; a "driver" or "loudspeaker driver" means a transducer which converts electrical energy into sound or acoustic energy. Sound dispersion describes the directional way sound from a source (e.g., a loudspeaker) is dispersed or projected. Wide dispersion, or low directivity, indicates that a source radiates sound widely and fairly consistently in many directions; the widest being omnidirectional where sound radiates in all directions. Narrow dispersion, or high directivity, indicates that a source radiates sound more in one direction and predominantly over a limited angle. Dispersion can also be asymmetric; that is, the dispersion in one axis can also vary for different angles or directions on another axis. The term "channel" means an audio signal plus metadata in which the position is coded as a channel identifier (e.g., left-front or right-top surround); "channel-based audio" is audio formatted for playback through a pre-defined set of speaker zones with associated nominal locations, (e.g., 5.1, 7.1, and so on); the term "object" or "object-based audio" means one or more audio channels with a parametric source description, such as apparent source position (e.g., 3D coordinates), apparent source width, etc.; "immersive audio" or "spatial audio" means channel-based and/or object-based audio signals plus metadata that renders the audio signals based on the playback environment using an audio stream plus metadata in which the position is coded as a 3D position in space; and "listening environment" means any enclosed or partially enclosed area, such as a room that can be used for playback of audio content alone or with video or other content, and can be embodied in a cinema, theater, auditorium, studio, and the like.

In an embodiment, one or more speakers and speaker mounting systems are installed in a cinema or similar listening environment, such as that shown in FIG. 1. For the example embodiment of FIG. 1, cinema 100 is a large rectangular room that has a screen 102 on one wall that faces rows of seats 104 that typically arranged in successively elevated rows from front to back. The room 100 is enclosed by side walls 106a and 106b, a ceiling 108, and a back wall (not shown) to form a sealed room. The screen (or stage) 102 represents the focal point of the room for viewers watching a program, but the sound is typically played back through speakers arranged throughout the room so that the sound is projected around the audience.

Though embodiments may be shown and described with respect to cinema listening environments, it should be noted that the FIG. 1 is meant to represents any large venue, such as an auditorium, theatre, classroom, concert hall, large room, and so on. Such a venue might be referred to as a venue for "professional" A/V or audio installations to imply an installation that is typically larger than a home theatre implementation. Regardless of venue type, the listening area contains a number of listening positions (seats) where listeners are located. Many of the seats are not necessarily in the optimum position (sweet spot) for one or more of the speakers. Embodiments include speakers that are optimized to provide maximum coverage from each individual speaker location to most if not all of the seats 104 in the room 100.

In a surround-sound or immersive audio environment, a number of speakers in room 100 are mounted on the wall and possibly ceiling, along with floor mounted speakers. Such speakers may be arranged in any one of several known surround sound configurations, such as 5.1.4 surround, that provide height speakers for playback of height channels. Thus, as shown in FIG. 1, ceiling speakers 110 are provided for height audio signals, and side speakers 112 are provided for direct side sound. Other speakers (not shown) may be provided along the front wall near the screen 102 and in the back of the room 100 to provide other sound components. Such speakers may comprise speakers or speaker sets that provide the standard left, center, right, left surround, right surround, left front height, right front height, left rear height, right rear height, and low frequency effect (LFE or subwoofer) sound components, though embodiments are not so limited. Any appropriate number of speakers may be provided for each channel of the surround system, and any surround sound format may be used. Thus, it should be noted that any number of speakers in any appropriate configuration may be provided depending on the size, scale and use of the room 100, and that the speaker configurations described herein are intended only to be an example of relative speaker placement in an embodiment. It should be further noted that FIG. 1 is not drawn to scale and may represent any appropriate listening environment, such as a cinema, auditorium, or any other venue appropriate for professional audio system installations that are part of a standalone audio system or as part of an A/V or other media playback, gaming, or simulation (e.g., virtual reality) system.

In present systems in which the room area is large and/or where there is a large number of seats, hence listening positions, the speakers are typically unable to project sound equally well for all seats in the venue. For example, seats closer to the screen or stage may hear much more of the center and front-positioned speakers than seats in the rear of the room. The frequency response of speakers is also negatively impacted by the projection of sound across a large distributed listening area. Waveguide speakers have been developed to improve coverage and provide even spectrum content, however present waveguide designs often do not provide adequate sensitivity and coverage patterns, especially with newer immersive audio content that may have significant height components.

Figure 2:
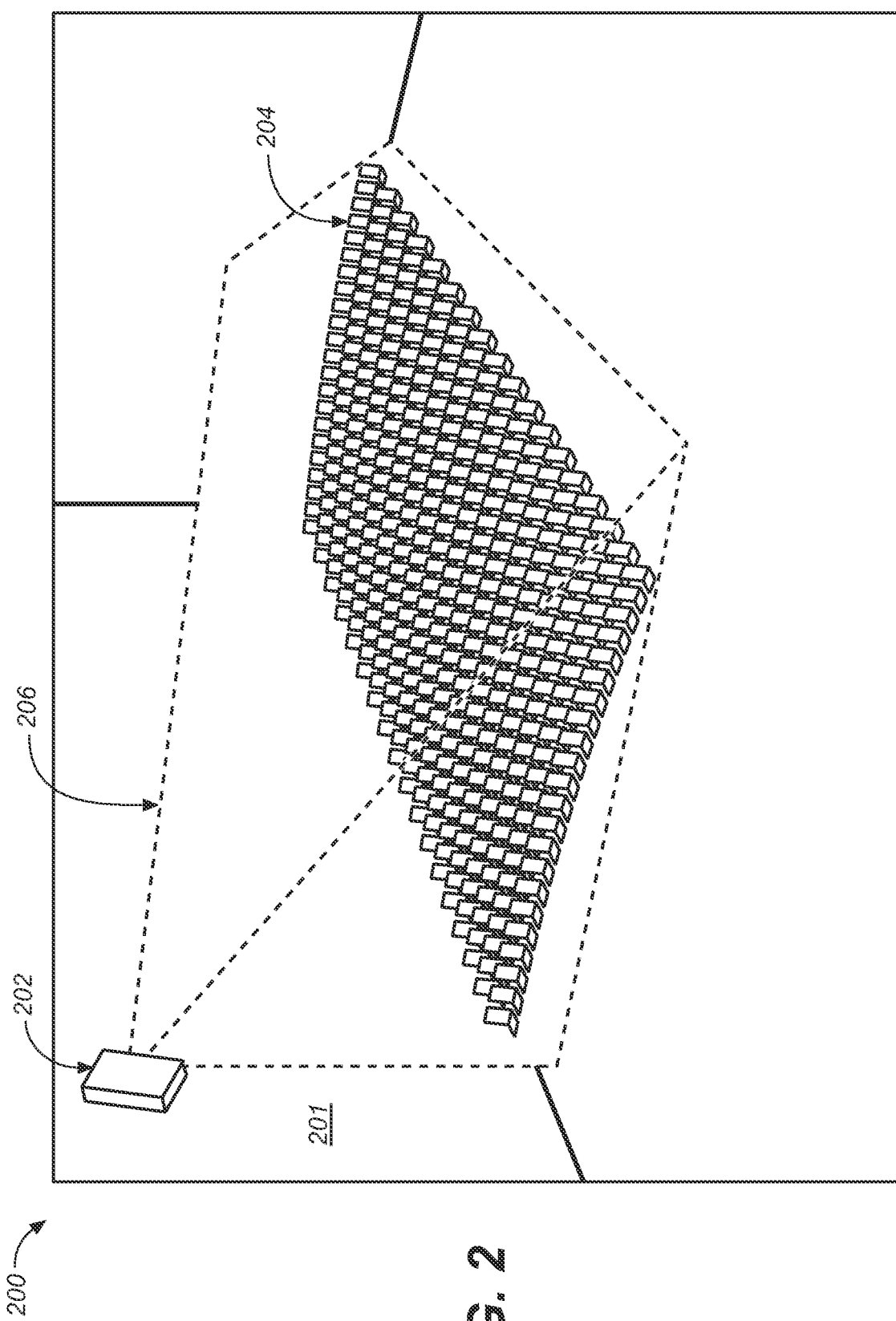
FIG. 2 illustrates an example sound dispersion pattern for a waveguide speaker that may use an enclosure and rigging system under some embodiments.

FIG. 2 illustrates an example sound dispersion pattern for a waveguide speaker that may use an enclosure and rigging system to improve frequency response for certain sound dispersion patterns, under some embodiments. For the example of FIG. 2, a listening area 200 has a speaker 202 mounted on a side wall 201. The speaker is a horn waveguide speaker that produces an example sound dispersion pattern 206 over the rows of seats 204 in the listening area. As FIG. 2 illustrates just one speaker out of several speakers that may be provided in the room, and one example of a sound dispersion pattern based on the type of speaker that may be used, i.e., a horn waveguide speaker. As shown in FIG. 2, the sound dispersion pattern 206 is asymmetrically distributed within the room. As can be appreciated by those of ordinary skill in the art, similar or analogous dispersion patterns are produced for other speakers as they are positioned along different walls and regions of the walls, and are not shown for clarity.

In an embodiment, the speaker 202 and other speakers in room 200 have specially shaped enclosures and rigging systems that allows them to be positioned straight and/or tilted or rotated relative to the listening area 204 to optimize the dispersion pattern and the consequent frequency response characteristics of the speakers over the entire listening area.

In an embodiment, one or more of the speakers of FIG. 1 (as typified by example speaker 202 of FIG. 2) are configured to spread high frequencies in a way that matches the actual or typical seating layout in the venue 100 that the speakers are located so as to provide maximum coverage from a single speaker location. The speakers are configured to provide progressive horizontal coverage width, from small to large and a somewhat narrow vertical dispersion. In an embodiment, an asymmetric horn configuration is used to spread the higher frequencies on the lower side of the horn. For cases in which the speaker is a high wall mount or ceiling mount speaker, the speaker system may also include a mounting system that allows for quick rigging and aiming of the horn driver in overhead and side surround positions. The mount system is configured to provide 3-axis (x, y, z) of adjustment to aim the driver into the listening area.

Speaker/Driver System

A first description will cover the speaker and driver configuration of the combined speaker/mounting system according to embodiments. In an embodiment, the asymmetric speaker comprises a specific waveguide mated to a coaxial loudspeaker to form an asymmetric horn. Such a speaker can be mounted directly on a high wall surface or facing downward from the ceiling, or it can be mounted using the 3-axis rigging system, depending on requirements and venue layout. In an embodiment, the coaxial speaker is a 12" conical driver, though embodiments are not so limited. Any size and configuration of driver may be used and the waveguide can be configured accordingly.

Specific speaker configurations are tailored based on different size and shaped auditoriums. In an embodiment, coverage angles needed to provide desired achievable coverage can be calculated in terms of two axes: Axis 1 represents room side to side coverage, and Axis 2 represents room front to back coverage. This can produce five generalized groupings of requirements that include both ceiling mounted (overhead) speakers and wall-mount side (side surround) speakers.

Figure 3A:
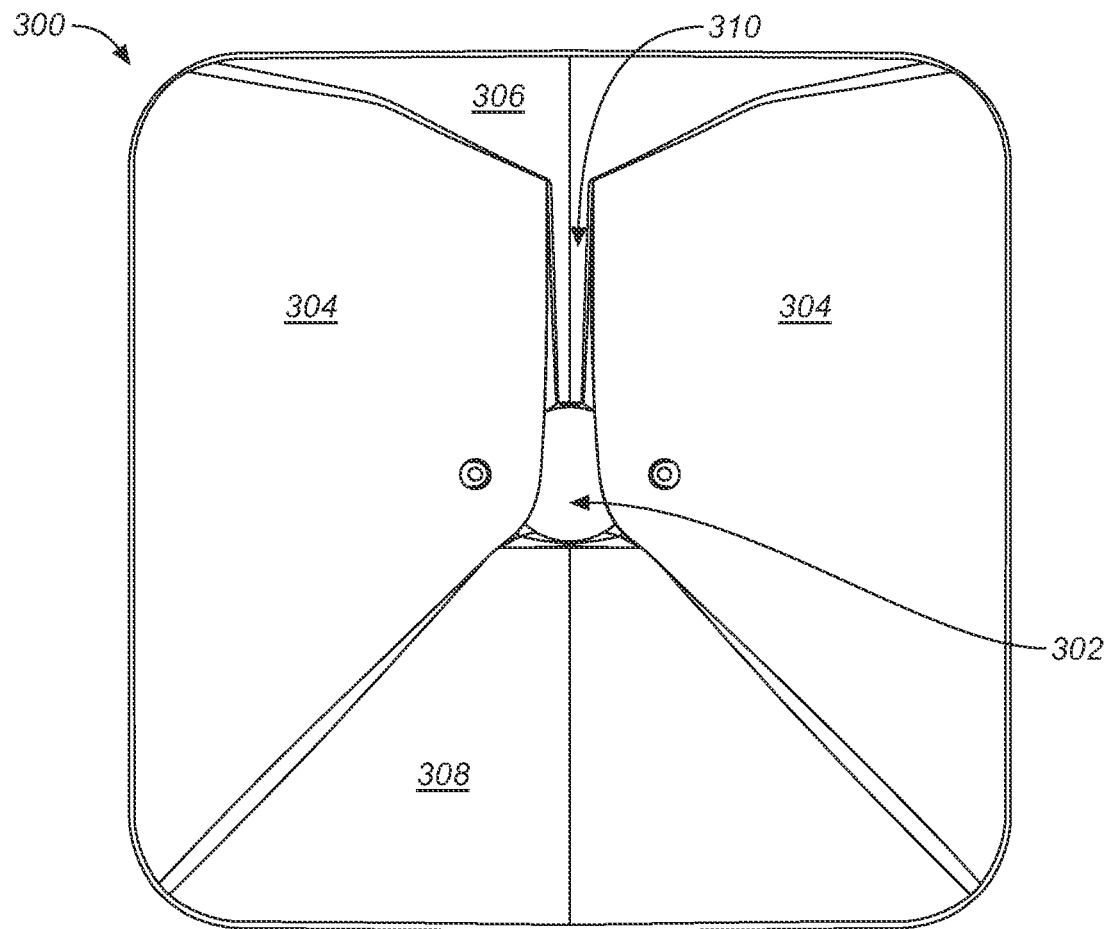
FIG. 3A is a top view looking down onto a waveguide under an example embodiment.
Figure 3B:
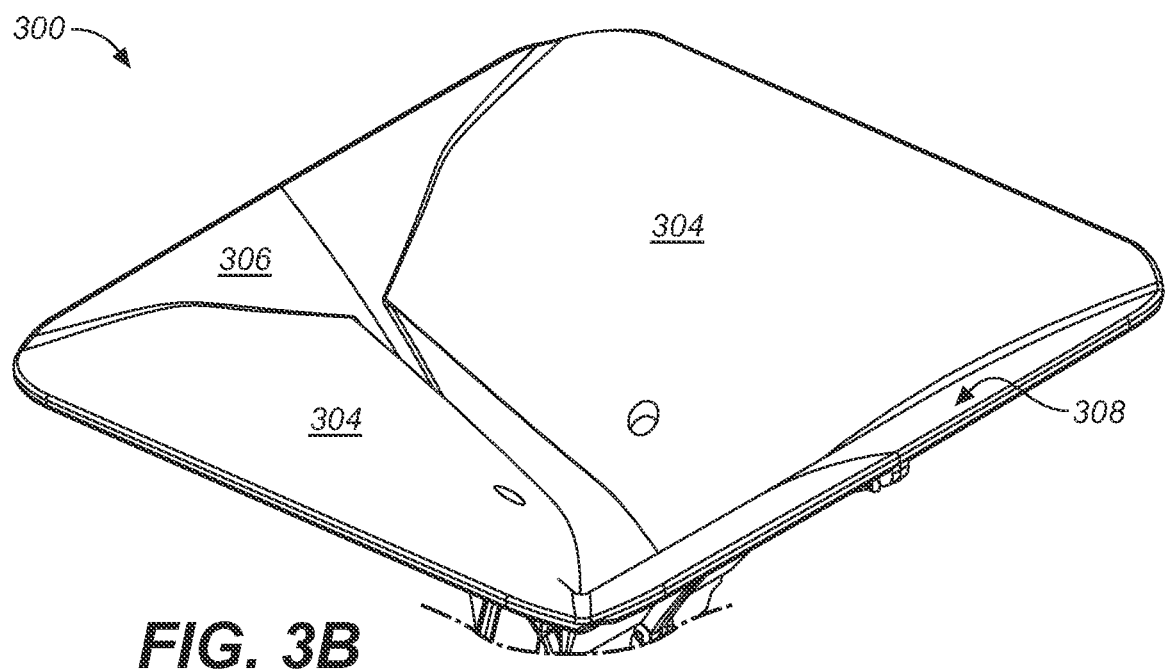
FIG. 3B is a perspective view of the waveguide of FIG. 3A.
Figure 3E:
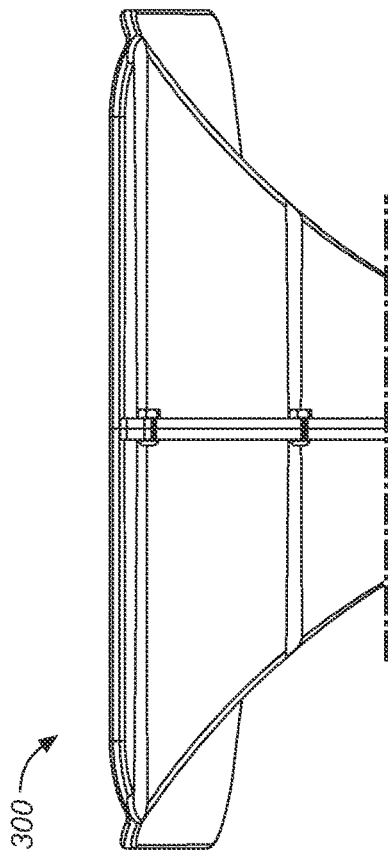
FIG. 3E is a back view of the waveguide of FIG. 3A.

Each waveguide is an asymmetric horn waveguide that has a throat that expands into a wider opening. FIGS. 3A to 3E illustrate different views of an example waveguide under some embodiments. FIG. 3A is a top view looking down onto a waveguide 300. Waveguide 300 includes a throat area 302 projecting upward from a mounting portion that mates to the coaxial driver so that sound is projected out perpendicular to the drawing page. A set of curved surfaces 304 and 306 form a channel 310 that guides the sound out from the waveguide 300 along the x-axis and y-axis of the waveguide. Surfaces 304 are symmetrical with each other and surfaces 306 and 308 are non-symmetrical so that waveguide 300 is asymmetric about its x-axis. FIG. 3B is a perspective view of the waveguide of FIG. 3, and shows the curvature and relative sizes of surfaces 304, 306 and 306. FIG. 3C is a front view of the waveguide of FIG. 3A; FIG. 3D is a side view of the waveguide of FIG. 3A; and FIG. 3E is a back view of the waveguide of FIG. 3A.

The curvature of the surfaces 304, 306, and 308 may be changed to alter the degree of sound projection. For the example of FIGS. 3A to 3E, the curvature may be configured to produce an 80-degree asymmetrical horn waveguide. Any other practical projection angle is also possible, such as 60 degrees, and so on. Other design parameters may also be altered depending on configuration requirements, such as the size of the throat area 302, the length and width of the gap 310, the size and shape of the outer dimensions, the difference in size of the asymmetric surfaces, the angle of inclination (e.g., as shown in FIG. 3D), and any other appropriate design parameter of the waveguide.

Using the illustration of FIGS. 3A to 3E, five views of a practical horn (waveguide plus coaxial driver) configurations are described. A first view of the horn, denoted Horn #1 is an overhead surround towards the screen with Axis 1 at an even 70 degrees and Axis 2 starts at 50 degrees spreading to 70 degrees on the bottom. A second view of the horn, denoted Horn #2 is an overhead surround towards the back of room Axis 1 is an even 70 degrees, and Axis 2 starts at 50 degrees spreading to 110 degrees on bottom. A third view of the horn, denoted Horn #3 is an overhead surround in center of room where Axis 1 is an even 70 degrees, and Axis 2 is an even 115 degrees. A fourth view of the horn, denoted Horn #4 is a side surround, where the vertical axis is an even 60 degrees, and the horizontal axis starts at 70 degrees spreading to 165 degrees on bottom. A fifth view of the horn, denoted Horn #5 is a rear surround where the vertical axis is an even 45 degrees, and the horizontal starts at 50 degrees spreading to 155 degrees on bottom.

It should be appreciated that many different configurations of the horn waveguide are possible by altering one or more of the design parameters mentioned above. For a practical application of a large-scale cinema and immersive audio as well as standard surround-sound audio, example practical asymmetric horn waveguide speakers are configured as (1) an asymmetrical horn featuring a progressive coverage of 80-130×80 degrees intended for overhead surrounds towards the screen and towards the back of the auditorium; and (2) an asymmetrical horn featuring a progressive coverage of 60-150×60 degrees intended for side wall and rear wall surrounds. Each of these two waveguides would be used with identical or different woofers. In an embodiment, certain rigging structures (described further below) allow adjustments to the front and back, side to side and also rotation so that these horns can be properly aligned with the seating by an installer. In an application, these drivers could be rated for use in a Dolby Atmos (or similar, such as 7.1 surround) installation up to approximately 70 feet away from reference position, for example.

As described above, the shape and configuration of the surfaces of the waveguide define the degree of sound dispersion from the speaker. Any amount of dispersion can be created depending on the system needs. As further mentioned above, example dispersions comprise an 80-degree horn for overhead speakers to provide optimized coverage from a point source overhead mounted over raked seating. An optional mounting system provides 3-axes of adjustment for the best optimization. The overall coverage window for this type of speaker is 80 degrees vertical, 80 degrees horizontal at the top of coverage transitioning down to 130 degrees horizontal at the bottom of coverage.

For side and back walls, a 60-degree horn may be used. In an embodiment, a 60-degree horn can be formed similar to the 80-degree horn shown in FIG. 3A except with the throat area 310 and/or speaker opening 302 made slightly narrower/smaller, along with any other appropriate surface changes. The 60-degree horn generally provides optimized coverage from a point source into seating that extends very close to the bottom side of the speaker but is flat across the coverage aiming angle (little change of elevation is relation to the aiming angle of the speaker itself). This speaker may also require three axes of adjustment for the best optimization when used on a side wall with raked seating, and may be provided with an optional mounting system as described below. The overall coverage window for this speaker is 60 degrees vertical, 60 degrees horizontal at the top of coverage transitioning down to 150 degrees horizontal at the bottom of coverage.

These provide only some examples of possible speaker configurations, and many others are also possible as can be appreciated by those of ordinary skill in the art.

Mounting/Rigging System

The waveguide can mount to the coaxial speaker through a suitable mounting apparatus. The examples of FIGS. 3A to 3E illustrate an embodiment in which the waveguide is mounted to a coaxial driver for a wall-mount speaker system in which the horn speaker projects from an upper or lower surface of the side wall 106 into the auditorium or cinema (venue).

Figure 4:
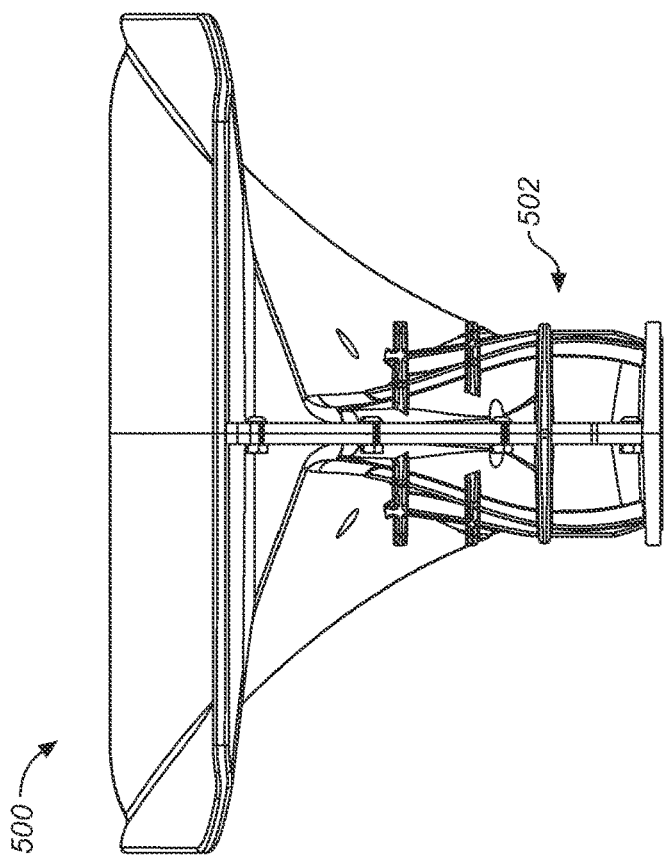
FIG. 4 illustrates a mounting system for an asymmetric horn waveguide speaker under an embodiment.
Figure 5A:
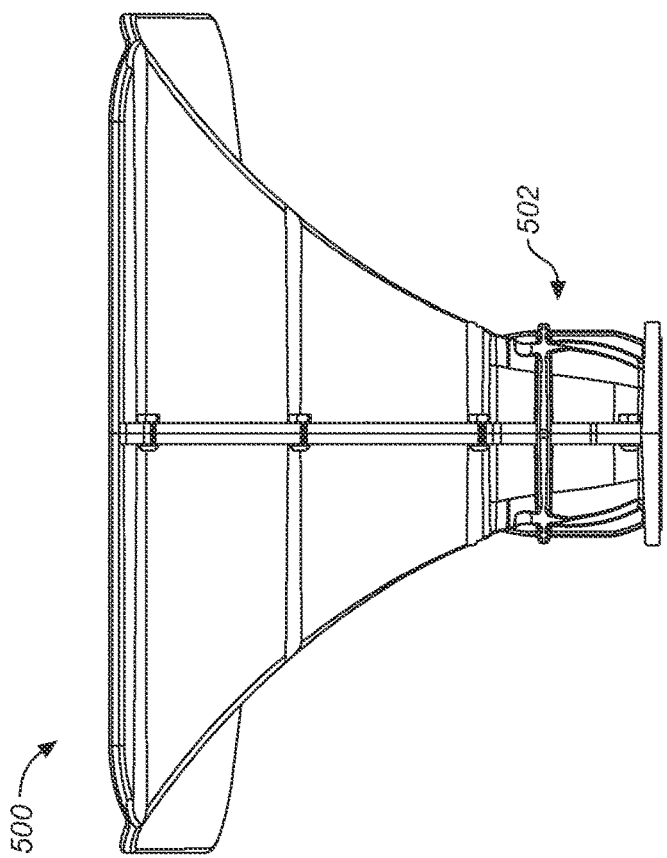
FIG. 5A is a side view of the example waveguide of FIG. 4.
Figure 5B:
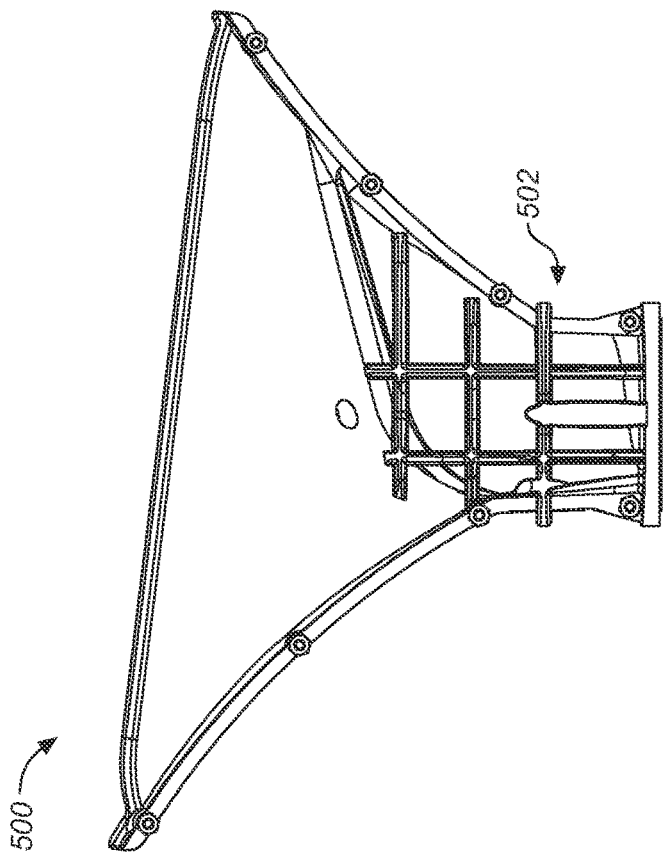
FIG. 5B is a rear view of the example waveguide of FIG. 4.

FIGS. 4 and 5A, 5B illustrate a horn waveguide configured to mount onto a coaxial driver for a wall mount system under an embodiment. FIG. 4 illustrates a front view of waveguide 500 with an elongated throat section 502 for connection to a flange or mating surface of the coaxial speaker. FIG. 5A is a side view of the example waveguide of FIG. 4, and FIG. 5B is a rear view of the example waveguide of FIG. 4. It should be noted that many different configurations of such a side-mount mounting structure are possible depending on the configuration requirements and constraints.

As described above, in an embodiment, the projection angle of the waveguide is dictated by the configuration of the surfaces of the waveguide. FIG. 5C is a cutaway view 520 showing two halves 522 and 524 of the waveguide surfaces for an 80-degree asymmetrical horn waveguide based on waveguide 500 of FIG. 4. The waveguide 520 may be formed by joining the two separate portions 522 and 524 together with screws/bolts 526 or similar fixing means. Similarly, FIG. 5D is a cutaway view 530 showing two halves 532 and 534 of the waveguide surfaces for a 60-degree asymmetrical horn waveguide based on waveguide 500 of FIG. 4. The appropriate angle, e.g., 60 or 80 is formed by broadening or narrowing the exit portion of the waveguide as shown in FIGS. 5C and 5D. Both portions (e.g., 522 and 524) may be symmetric with one another to form a uniform sound dispersion angle upon exit from the waveguide, and may be formed by straight or relatively straight lines. Alternatively, the exit angle may be formed through curved surfaces, compound curved surfaces, and so on. Furthermore, the different sections may be asymmetrical in that one side (e.g., 522) may have a different angle than the other side (e.g., 524). The configurations of FIGS. 5C and 5D are intended to illustrate just some example configurations of the waveguide, and many other configurations are possible. For example, instead of two pieces, a single formed or molded piece may be used, or more than two portions may be used, such as three or four portions to allow for further shaping of the exit angle. The height, spread, baffling, material, and other design/construction parameters may also be modified to impart different sound dispersion angles from the waveguide.

In an embodiment, the wall mount versions of the horn waveguide speaker are used with a mounting and rigging system that provides 3-axis of movement. This allows a technician to conveniently aim the speaker toward a desired location in the auditorium for a desired coverage pattern.

Figure 6A:
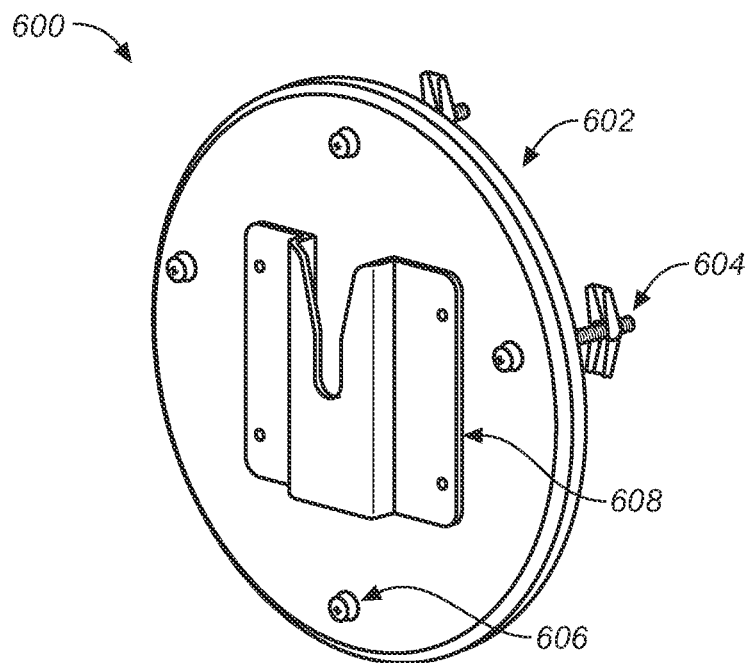
FIG. 6A illustrates a wall mount assembly for a wall-mounted horn waveguide speaker under an embodiment.

For the wall mount version, a wall plate and yoke brace are used to hold the speaker perpendicular to the wall and allow the speaker to be tilted up and down, turned left and right, and rotated about a perpendicular axis to the wall. This provides 3-axis of movement of the wall mounted horn waveguide speaker. FIG. 6A illustrates a wall mount assembly for such a speaker under an embodiment. As shown in FIG. 6A, wall plate 602 is fixed to the wall through mounting means such as toggle bolt 604 and washer 606 systems, or similar attachment means. A flange 608 provides a mounting structure to the yoke 610, which is shown in FIG. 6B.

Figure 6B:
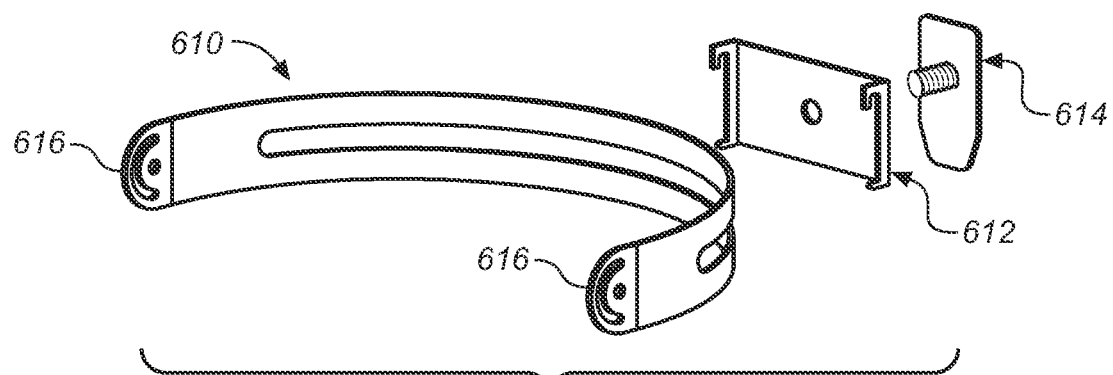
FIG. 6B illustrates a yoke structure for the wall-mount assembly of FIG. 6A.

As shown in FIG. 6B, yoke 610 comprises a semicircular bar with mounting ends 616. Semicircular slots formed into the yoke 610 and each mounting end 616 allow the installed speaker (not shown) to rotate within the structure. The main slot in yoke 610 allows for a pan movement, and the slots in the ends allow for the tilt movement. The yoke is connected by a nut and washer (not shown) to insertion plate 614 through bracket 612. Insertion plate 614 is inserted into the appropriate slot of flange 608 of wall plate 600 when the speaker assembly is ready to be mounted onto the wall. In an embodiment, bracket 612 is configured to hold the yoke and allow it to be rotated around the bolt of plate 614. This provides the rotation axis of movement.

FIG. 7A illustrates a side view of a spherical speaker enclosure for use with a rigging assembly under some embodiments. As shown in FIG. 7A, the speaker enclosure 700 mounts a speaker in the yoke 610 by attaching the ends 616 to appropriate anchor points in the speaker housing. The anchor point in the end 616 allows the speaker 700 to be tilted up or down relative to the main axis of the yoke 610. Likewise, the slot in the yoke 610 allows the speaker 700 to be turned right or left (into or out of the drawing page). FIG. 7B is a front (or rear) view of the speaker assembly 700 of FIG. 7A showing the attachment of the yoke 610 through ends 616 on either side of the speaker housing 700. The yoke 610 may be provided in any shape depending on the size and shape of the speaker. It is configured to allow movement of the speaker across the 3-axis of pan, tilt and rotation. FIG. 7B shows a formed portion of a grill 710 in a front surface of the speaker assembly 700 that accommodates mounting and placement of the waveguide, such as waveguide 300 of FIG. 3. The size and shape of grill portion 710 is configured to match the size and shape of the waveguide so that sound can be appropriately projected from the enclosure 300. In general, the body of enclosure 300 is spherical or generally spherical to facilitate mounting in a 3-axis rigging system. Alternatively, other shaped volumes may be used, such as cubic, oval, and so on.

As stated above, the term "3-axis speaker assembly" refers to a speaker system that includes a rigging system and a speaker that comprises a spherical speaker enclosure and a waveguide. Thus, the 3-axis speaker assembly comprises the three main components of a waveguide, spherical enclosure, and rigging system.

For the ceiling-mounted asymmetrical horn waveguide speaker, a similar type of yoke structure can be used. FIG. 8 illustrates a ceiling mount rigging system for an asymmetrical horn waveguide speaker for use in a drop ceiling under an embodiment. As shown in FIG. 8, a ceiling plate is mounted to ceiling tile of a drop ceiling using appropriate mounting hardware 802. Yoke 804 is attached to the plate 800 through appropriate bolt 808 and washer/nut 806 assemblies, and 802 assembly. Such ceiling kits provide a cheaper and easier method of mounting Atmos (and similar) systems in professional installations.

Figure 9A:
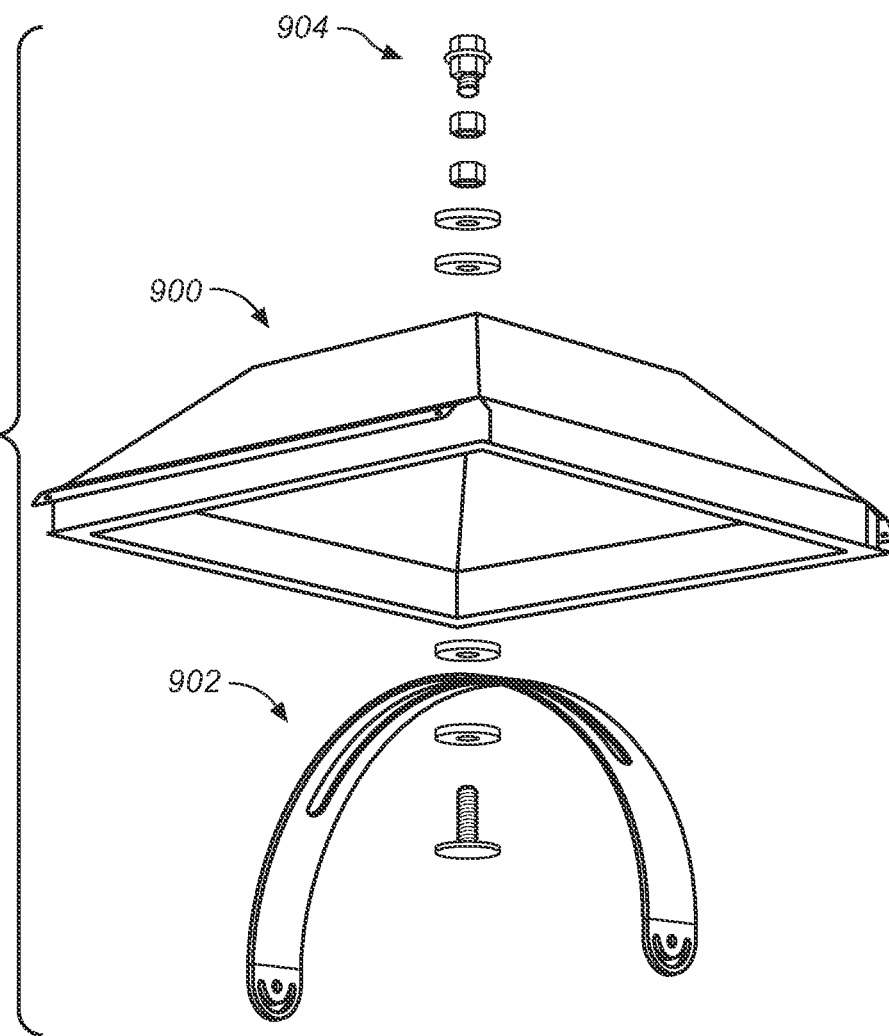
FIG. 9A illustrates an inset or recessed ceiling mounted assembly for a horn waveguide under an embodiment.
Figure 9B:
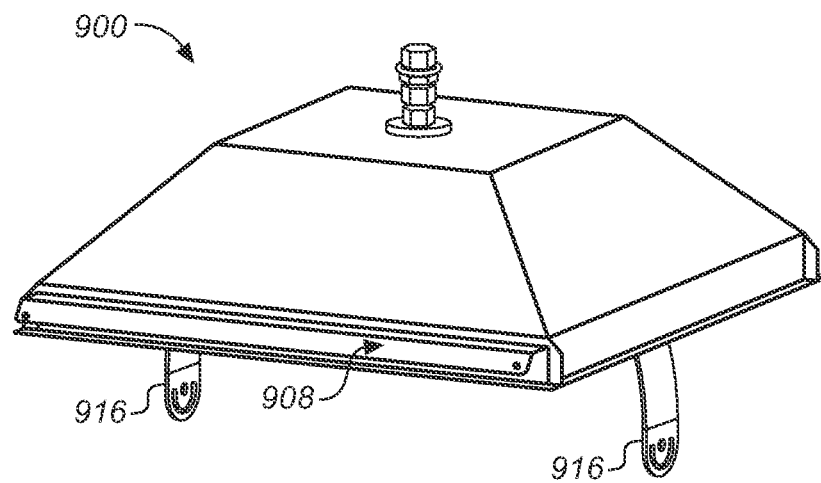
FIG. 9B illustrates an assembled recessed mounting assembly under an embodiment.

The plate may be configured for flush mount or recessed mount or partially recessed mount depending on the desired configuration and need to have the speaker hidden within the ceiling or protruding or hanging down from the ceiling. The flat configuration shown in FIG. 8 allows for relatively fast and easy rigging into a ceiling tile grid, as the plate can be fashioned into the same shape and size as a single ceiling tile (or groups of tiles). The inset or recessed system insets the speaker further into the grid to keep the ceiling clear avoid the projector beam. FIGS. 9A and 9B illustrate an inset or recessed ceiling mounted assembly for a horn waveguide under an embodiment. As shown in FIG. 9A, ceiling plate 900 comprises a housing that fits into the ceiling so that a portion of the flange is flush with the ceiling. Yoke 902 is connected to the housing plate through the appropriate mounting hardware 904. FIG. 9B illustrates a completed recessed ceiling mount showing the flange 908 with the ends 916 of the yoke for holding the speaker (not shown) protruding downward. This facilitates the mounting of a non-circular speaker inset in the ceiling.

The wall and ceiling mounted assemblies illustrated herein included a common yoke comprising a semi-circular band, or similar structure, to hold the speaker and attach to either a wall or ceiling mounted plate. This rigging assembly provides a 3-axis aiming adjustment as follows: (1) the yoke attachment to the speaker allows for up and down positioning, (2) the slot in the yoke allows for side-to-side positioning, and the single point attachment to the wall or ceiling allows for rotation. The assembly technician can set the aim of the speaker by adjusting any of these motions and use the mounting hardware to tighten the speaker into a fixed position. Once installed, the appropriate speaker wire can be connected to the wall or ceiling mounted driver.

The size and dimensions of the illustrated mounts are provided for illustration only, and embodiments are not so limited. Any appropriate size or shape of wall or ceiling mount may be used. Likewise, the configuration, size, and shape of the yoke and the appropriate rotational slots or grooves can be changed to suit the size and shape of the speaker. The illustrated example showed a yoke that was shaped for a circular speaker housing. For the waveform horn speaker shown in FIGS. 1-5, a yoke of corresponding shape may be used.

Embodiments of the horn waveguide and mounting/rigging assembly described herein may be used with surround-sound audio content and/or immersive audio content played in relatively large listening halls with a multitude of seats. Thus, aspects of the audio environment described herein represent the playback of the audio or audio/visual content through appropriate speakers and playback devices, and may represent any environment in which a listener is experiencing playback of the captured content, such as a cinema, concert hall, theater, a home theater or room in a home, conference room, or any other large playback environment. Although embodiments have been described primarily with respect to examples and implementations in a commercial theater or home theater environment in which the spatial audio content is associated with movie or television content, it should be noted that embodiments also may be implemented in other consumer-based systems, such as games, screening systems, and any other monitor-based A/V system. The spatial audio content comprising object-based audio and channel-based audio may be used in conjunction with any related content (associated audio, video, graphics, etc.), or it may constitute standalone audio content.

The construction materials for the manifold and any associated speaker cabinets may be tailored depending on system requirements, and many different configurations and sizes are possible. The mounting hardware may be made of any appropriate material as known to those of skill in the art of construction and joinery.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A speaker for transmitting sound into a venue, the speaker comprising:
    an asymmetrical horn waveguide configured to impart a progressive horizontal coverage width and a narrow vertical dispersion to form a horn speaker, wherein the horn speaker is configured to be oriented in the venue such that the horn speaker is aimed to a location that provides maximum coverage of the venue within a passband of the asymmetrical horn waveguide,
        wherein the horn speaker provides overhead coverage towards a front of the venue and towards a rear of the venue,
        wherein the asymmetrical horn waveguide is configured to impart the progressive horizontal coverage width by providing a coverage window in which a horizontal coverage width transitions from a first angle at a top of a vertical coverage angle to a second angle at a bottom of the vertical coverage angle, the first angle being smaller than the second angle, wherein the first angle is 80 degrees, wherein the second angle is 130 degrees, and wherein the vertical coverage angle is 80 degrees; and
    a driver acoustically coupled to the asymmetrical horn waveguide;
    wherein the sound transmitted by the speaker includes object-based audio.

2. The speaker of claim 1, wherein the horn speaker is configured to be mounted to an upper surface of the venue, and wherein the upper surface comprises a ceiling with the horn speaker pointing substantially downwards into the venue.

3. The speaker of claim 1, wherein the asymmetrical horn waveguide is configured to spread high frequency content of audio output by the driver across a lower side of the horn speaker.

4. The speaker of claim 1, wherein the asymmetrical horn waveguide includes a vertical axis and horizontal axis defined by two symmetric surfaces opposed about a vertical plane of the horn speaker and by two asymmetric surfaces opposed about a horizontal plane of the horn speaker; and
    wherein a sound projection from the asymmetrical horn waveguide is determined by at least one of the group consisting of: a curvature of the symmetric and asymmetric surfaces, a size of each of the symmetric and asymmetric surfaces, a distance between the symmetric and asymmetric surfaces, a size of a throat defined by a length and width of an adjustable gap between the surfaces, and combinations thereof.

5. The speaker of claim 1, wherein the horn speaker points substantially outwards at the first angle; and
    wherein the horn speaker points substantially downwards at the second angle.

6. A speaker for transmitting sound into a venue, the speaker comprising:
    an asymmetrical horn waveguide configured to be asymmetric about one of a vertical axis and a horizontal axis of the asymmetrical horn waveguide,
        wherein the speaker provides surround sound coverage from a side portion or a rear portion of the venue,
        wherein the asymmetrical horn waveguide is configured to impart progressive horizontal coverage width by providing a coverage window in which a horizontal coverage width transitions from a first angle at a top of a vertical coverage angle to a second angle at a bottom of the vertical coverage angle, the first angle being smaller than the second angle, wherein the first angle is 60 degrees, wherein the second angle is 150 degrees, and wherein the vertical coverage angle is 60 degrees; and
a driver acoustically coupled to the asymmetrical horn waveguide;
wherein the sound transmitted by the speaker includes object-based audio.

7. The speaker of claim 6, wherein the speaker is configured to be mounted to an upper surface of the venue, and wherein the upper surface comprises one of (i) a high wall location with the speaker pointing substantially outwards into the venue and (ii) a ceiling with the speaker pointing substantially downwards into the venue.

8. The speaker of claim 6, wherein the asymmetrical horn waveguide is configured to spread high frequency content of audio output by the driver across a lower side of the speaker.

9. The speaker of claim 6, wherein the vertical axis and the horizontal axis are defined by two symmetric surfaces opposed about a vertical plane of the speaker and by two asymmetric surfaces opposed about a horizontal plane of the speaker; and
wherein a sound projection from the asymmetrical horn waveguide is determined by at least one of the group consisting of: a curvature of the symmetric and asymmetric surfaces, a size of each of the symmetric and asymmetric surfaces, a distance between the symmetric and asymmetric surfaces, a size of a throat defined by a length and width of an adjustable gap between the surfaces, and combinations thereof.

10. The speaker of claim 6, wherein the speaker points substantially outwards at the first angle; and
wherein the speaker points substantially downwards at the second angle.

11. A speaker for transmitting sound into a venue, the speaker comprising:
an asymmetrical horn waveguide having a vertical axis and horizontal axis defined by two symmetric surfaces opposed about a vertical plane of the speaker and by two asymmetric surfaces opposed about a horizontal plane of the speaker, wherein a sound projection from the asymmetrical horn waveguide is determined by at least one of the group consisting of: a curvature of the symmetric and asymmetric surfaces, a size of each of the symmetric and asymmetric surfaces, a distance between the symmetric and asymmetric surfaces, a size of a throat defined by a length and width of an adjustable gap between the surfaces, and combinations thereof,
wherein the speaker provides rear surround sound coverage from a rear portion of the venue,
wherein the asymmetrical horn waveguide is configured to impart progressive horizontal coverage width by providing a coverage window in which a horizontal coverage width transitions from a first angle at a top of a vertical coverage angle to a second angle at a bottom of the vertical coverage angle, the first angle being smaller than the second angle, wherein the first angle is 50 degrees, wherein the second angle is 155 degrees, and wherein the vertical coverage angle is 45 degrees; and
a driver acoustically coupled to the asymmetrical horn waveguide;
wherein the sound transmitted by the speaker includes object-based audio.

12. The speaker of claim 11, wherein the speaker is configured to be mounted to an upper surface of the venue, and wherein the upper surface comprises one of (i) a high wall location with the speaker pointing substantially outwards into the venue and (ii) a ceiling with the speaker pointing substantially downwards into the venue.

13. The speaker of claim 11, wherein the speaker points substantially outwards at the first angle; and
wherein the speaker points substantially downwards at the second angle.

* * * * *